United States Patent [19]

Higgins

[11] Patent Number: 5,753,286
[45] Date of Patent: May 19, 1998

[54] COATED FOOD AND METHOD OF COATING

[75] Inventor: Camille A. Higgins, Rockford, Ill.

[73] Assignee: Kerry Ingredients, Inc., Beloit, Wis.

[21] Appl. No.: 741,958

[22] Filed: Oct. 31, 1996

[51] Int. Cl.⁶ .............. A23B 4/10; A23B 7/16; A23L 1/0524; A23L 1/216

[52] U.S. Cl. .............. 426/92; 426/94; 426/102; 426/291; 426/296; 426/574; 426/577; 426/615; 426/637; 426/641; 426/643; 426/644

[58] Field of Search ............... 426/92, 93, 94, 426/102, 291, 296, 574, 577, 615, 637, 641, 643, 644, 293

[56] References Cited

U.S. PATENT DOCUMENTS

| | | | |
|---|---|---|---|
| 4,675,191 | 6/1987 | Banner et al. | 426/296 X |
| 5,431,944 | 7/1995 | Melvej | 426/92 X |
| 5,595,777 | 1/1997 | Chalupa et al. | 426/293 X |
| 5,601,861 | 2/1997 | Gerrish et al. | 426/102 X |
| 5,620,727 | 4/1997 | Gerrish et al. | 426/102 X |

*Primary Examiner*—Arthur L. Corbin
*Attorney, Agent, or Firm*—Griffin, Butler, Whisenhunt & Szipl

[57] ABSTRACT

A food having an oil absorption and moisture transmission retarding, clear, crunchy coating and process for preparing is provided. The coating includes a predust adhered to the food and has at least about 50% of a starch and from about 0.1% to 5% of an at least partially water-soluble, edible calcium compound. A water-containing batter is gelled and adhered to the predust and has, on a solids basis, at least about 20% dextrin, about 0.1% to 8% of a pectate, and about 0.05% to 5% of a water-soluble thickener.

42 Claims, No Drawings

COATED FOOD AND METHOD OF COATING

The present invention relates to a food having a coating thereon and more particularly wherein the coating is an oil absorption retarding and moisture transmission retarding coating and which coating may be relatively clear when the coated food is either precooked or fully cooked.

BACKGROUND OF THE INVENTION

Foods are prepared with a coating thereon for not only preserving the texture, mouth feel and taste of the food during cooking, but also to provide a crispness to the coated food and to provide additional flavors thereto. Typical examples of such coated foods are chicken, fish, meat, shrimp and vegetables. These coatings vary from very thick and opaque coatings, such as breading coatings on deep fried breaded shrimp, to light and relatively clear coatings, such as egg and milk coatings on vegetables. While such coated foods may be cooked by broiling, baking and frying, most such coated foods are intended for cooking by frying and especially oil frying or deep-oil frying, such as fried chicken, tempura (e.g. vegetables and seafood), shrimp and French fried potatoes. When frying in oil, essentially all of these coatings suffer from common disadvantages, especially in regard to the amount of oil absorbed by the coating during frying and the loss of moisture from the food. In some cases, loss of moisture is desirable, since the loss of moisture presents a crispness to the fried food, e.g. certain fried vegetables, such as okra, and French fried potatoes. On the other hand, that loss of moisture can be a significant disadvantage, for example, in the case of fried chicken. Oil absorption by the coating, however, is a long standing problem in the art. Absorbed oil tends to make the fried food somewhat greasy and adds substantial fat, which may be a health concern to some people. Further, after frying, and while being held at a warm temperature, moisture transmission into or out of the food can be most undesirable.

Accordingly, the art has long sought to provide coatings which significantly mitigate these difficulties and allow the preparation of the coated food with a more attractive coating and one which has an improved texture, taste and mouth feel, and especially one which has less absorbed oil.

In addition, some of the conventional coatings, upon being cooked, e.g. fried, tend to change from a relatively clear coating to one of increased browning and even dark brown colors can appear with the fried coatings, such that the color of the particular cooked food may be aesthetically unappetizing. Also, in frying the so-coated foods, especially deep-fat frying, flavors which may have been added to the food or the coating are easily vaporized or lost in the oil of that frying.

Throughout the progress of the art toward developing coatings of the above described nature, various approaches have been adopted to mitigate the difficulties noted above. Somewhat in chronological order of that progress, U.S. Pat. No. 3,395,024 proposes a coating for foods which can mitigate the darkening or browning upon frying, by coating the food product with an aqueous dispersion containing water-soluble algin and a carbohydrate comprising mono- and/or disaccharide sugar (preferably dextrose). The so-treated product is then submerged into a water-soluble source of calcium ion gelling agent for bonding the algin-sugar coating to the food product. The browning can be mitigated by adding undissolved or pasted edible amylosic material to the algin-carbohydrate coating composition. The algin-carbohydrate coating produces something of a barrier film in this regard, and the use of various types of barrier films or coatings of that nature has been a general direction of the art in solving the above problems.

U.S. Pat. No. 3,514,294 addresses the problem of fat absorption during frying of coated foods and proposes coating the food with a first powder coating containing starch, a minor amount of sugar, salt and leavening. Thereafter, the powder-coated food is battered with a composition comprising water, starch, minor amounts of sugar and leavening. A second powder coating in the nature of the first powder coating and a second batter in the nature of the first batter can also be applied. A small amount of starch is gelatinized to form a barrier to impede absorption of fat through the coating.

U.S. Pat. No. 3,865,962 produces a barrier on onion rings by dusting the onion rings in a cold water insoluble amylosic material, such as wheat flour, corn starch and the like, and then immersing the so-dusted onion rings in an aqueous dispersion of algin which is set by submerging the so-coated onion rings into a solution of a gelling agent, for example, a calcium salt. This produces a film of algin. Thereafter, the onion rings may be submerged in a conventional batter and/or breading.

U.S. Pat. No. 4,511,583 discusses the problems in the art, especially excessive oil absorption during frying of foods that are coated, and points out that a number of the prior art approaches to reducing the amount of absorbed fat have not been successful. The patent proposes spraying so-coated food products with an aqueous solution of gelatin or film-forming starches to provide a barrier.

U.S. Pat. No. 4,710,391 recognizes the difficulty of loss of flavor in deep-fat frying of coated foods and suggests encapsulating flavoring agents for mitigating that problem.

U.S. Pat. No. 5,431,944 is directed to coated foods which are frozen and reconstitutable by microwave heating. The coating consists of a leavening agent, a starch blend of high amylose starch and a further starch, dextrin and a food gum. A water batter of the ingredients is used to coat the foods, and the foods are then parfried and frozen for distribution. Pregelatinized starches and modified or unmodified starches may be used, especially corn and potato starches. It is also said that dextrin mitigates the effects of the leavening agent and produces more crispness. A food gum is used to increase the viscosity of the batter and is said to contribute to the cell structure of the batter.

These approaches of the prior art have all been efforts to mitigate the problems of prior art coatings, as noted above, but these approaches while, primarily, directed to one or more of the difficulties of the prior art, have failed to produce a coating which is a substantial barrier to oil absorption and moisture transmission while, at the same time, producing a crunchy coating, instead of a limp or soggy coating, and which has at least a somewhat clear appearance.

SUMMARY OF THE INVENTION

The present invention is based on several primary discoveries and several subsidiary discoveries. As a first primary discovery, it was found that a coating can be produced in a two-part system, which, when combined and stabilized forms a barrier to oil absorption and a barrier to moisture transmission, both during and after cooking of the food. Further, the coating has a crunchy mouth feel and may be substantially clear and may not brown. The first part of the coating is a predust which contains a starch which is suitable for film forming and a water-soluble edible setting agent.

The second part of the coating is a water-containing batter which contains dextrin and a composition which is settable by the setting agent in the first part of the coating. By this arrangement, the coating is not set until both parts of the coating system are applied to the food, but when both parts of the coating system are applied to the food and heated or cooled, the two-part coating system rapidly sets and stabilizes into an oil and moisture barrier.

While various systems containing a settable composition and a setting agent are known, as illustrated by the above-described prior art, for forming a film or barrier on food products, as a second primary discovery of the invention, it was found that the settable composition must be a pectate, since it was found that pectates are capable of rapid setting when the two parts of the coating system are applied to the food and that the barrier formed by that setting of the pectate is highly resistant to oil absorption, is a barrier to moisture transmission, and may remain clear even after frying of the food.

As a third discovery, it was found that the pectate should be set with a water-soluble calcium compound placed in the first part of the coating, i.e. the predust. That calcium compound, when not in contact with the second part of the coating, i.e. the batter, will not effect setting of the batter. This provides exceptional control for the coating and the properties of the coated food.

As a fourth discovery, it was found that the combination of the starch and the dextrin provides a very improved barrier in the above two regards.

As a subsidiary feature, it was found that, to effect such a barrier, the first part of the system, i.e. the predust, must contain at least 50% of the starch, and it was found that, in the second part of the system, i.e. the batter, there must be, on a solids basis, at least 20% of the dextrin, but more usually at least 30% or 35%, in order to provide a barrier of the above-described nature.

As a another subsidiary discovery, it was found that the amount of pectate in the second part of the system, i.e. the batter, can be relatively low, using that two-part system, i.e. from 0.1% to 8% of pectate. With such low amounts of pectate, correspondingly, the amount of water-soluble edible calcium compound in the first part of the system, i.e. the predust, can also be relatively low, i.e. 0.1% to 5%, which avoids any off taste that might otherwise occur with higher percentages of the calcium compound and the pectate. Nevertheless, even with such small amounts of the calcium compound and the pectate, a very impervious barrier, as noted above, is produced on the food.

As a further subsidiary discovery, it was found that the batter containing the dextrin and pectate must be kept in a uniform dispersion when being applied to the food having the predusted part of the system thereon. In order to ensure that uniformity of the batter, it was also found that the batter should contain a water-soluble thickener, which acts as a suspending agent, but that the amount of that water-soluble thickener can be quite low, e.g. from 0.05% to 5%.

Thus, broadly stated, the present invention provides a food having an oil absorption and moisture transmission retarding, crunchy, coating thereon, which coating comprises (as a first part) a predust adhered to the food and having at least 50% starch and from 0.1% to 5% of an at least partially water-soluble, edible calcium compound. A water-containing batter (as a second part) is gelled and adhered to the predust, which batter has, on a solids basis, at least 20% dextrin, from about 0.1 to about 8% of a pectate, and from about 0.05% to about 5% of a water-soluble thickener. The remaining ingredients in both the predust and batter are optional ingredients, as defined hereinafter.

Also provided and broadly stated is a method for producing an oil absorption and moisture transmission retarding, crunchy, coated food product. The method comprises applying and adhering a predust (as a first part) onto the food, where the predust has at least about 50% starch and about 0.1% to 5% of an at least partially water-soluble calcium compound. A water-containing batter (as a second part) is gelled and adhered to the predust, where the batter has, on a solids basis, at least about 20% dextrin, about 0.1% to 8% of a pectate and about 0.05% to 5% of a water-soluble thickener. The so-coated food is allowed to dwell for a sufficient time period such that the calcium reacts with the pectate to form sufficient calcium pectate so as to gel the coating. That gelled coating is then stabilized by either heating or cooling the so-coated food product.

DETAILED DESCRIPTION OF PREFERRED EMBODIMENTS

As briefly discussed above, the present coating for the food is a two-part system with a predust as a first part applied to the food and a batter as a second part later applied to the food. The batter contains a pectate and the predust contains a setting agent for the pectate, i.e. an at least partially water-soluble edible calcium compound. The predust also contains at least about 50% starch, and the batter contains at least about 20% dextrin. By action of the calcium compound with the pectate, the predust and batter on the food will gel and adhere to the food, which causes the combination of the predust and batter to not only be securely held on the food, but causes the commencement of the forming of an oil and moisture barrier, as noted above. Further, the combination of the starch and dextrin is capable, ultimately, of substantially aiding in the forming a very impervious barrier, but that barrier, to proceed to its ultimate properties, requires that the so-coated food be cooled or heated, e.g. frozen after applying the coating or heated when frying the food, either as a parfry (also known as a prefry) or as a final frying of the parfrying or as a complete frying in one step.

The food, itself, may be chosen from a wide variety of foods, including vegetables, meats, seafood and poultry, as noted above. Various fresh vegetables, such as broccoli, squash, eggplant, okra and the like, may be used with the present coating. Likewise, various meats, such as beef, pork, lamb and the like, may be used with the present coating. Normally fried seafood, such as shrimp, fish and oysters, may also be used as the food. Poultry, e.g. chicken, duck and turkey, either as parts or as whole poultry, may be used with the present coating.

As noted above, the predust is first adhered to the food and contains about 50% starch and about 0.01% to 5% of at least a partially water-soluble edible calcium compound. Any of the at least partially water-soluble edible calcium compounds may be used, but the preferred group of compounds are the hydroxides, phosphates, lactates and halides, such as calcium hydroxide, calcium phosphate, calcium lactate and calcium chloride. Whatever calcium compound is used, it must be at least partially water soluble so as to react with the pectate and, preferably, is capable of providing at least 50 parts per million (PPM) of solubilized calcium in the adhered batter per 1% of pectate in the batter (the second part of the present coating).

The starch can be chosen from a wide variety of starches and may be a pure starch itself, or may be the starch naturally contained in a starchy material, e.g. a cereal flour.

Thus, the starch may be in the form of pure starch itself or in the form of a starch derived from cereal flours or in the form of starch derived from modified cereal flours or it may be the cereal flours themselves or the modified cereal flours themselves. While any starch will be satisfactory, preferably, the starch is in the form of cereal flours and modified cereal flours or starch derived from said cereal flours or modified cereal flours, e.g. corn, rice or wheat or modified derivatives thereof.

While the predust must contain at least 50% starch, it is preferable that the starch be in a much higher amount, especially between about 60% and 95% starch in the predust.

The water-containing batter which is gelled and adhered to the predust, as noted above, will have, on a solids basis, at least about 20% dextrin, about 0.1% to 8% of a pectate, and about 0.05% to 5% of a water-soluble thickener. The thickener acts as a suspending agent for the dextrin, the pectate and optional ingredients, as hereinafter described, in the batter and avoids any settling or aggregation of those components in the batter while being used. Thus, the thickener is not critical and may be chosen from a wide range of thickeners, many of which are known in the art. However, it is preferred that the thickener is a gum, such as xanthan gum, since gums in general, and particularly xanthan gum, are capable of suspending the solids in the batter for long periods of time without substantial settling, do not interfere with the action of the pectate and calcium compound, and provide essentially no additional flavors to the coating.

While the dextrin must be, on a solids basis, at least 20% of the water-containing batter, it is preferred that the dextrin be in a higher amount, e.g. at least 30% or 40%, and it is most preferred that the dextrin be in even greater amounts, e.g. 65% or 80% or even at least 95% of the batter. A very preferred form of the invention is where the batter contains about 15% to 35% solids and, on a solids basis, contains about 1% to 2% of the pectate, about 97% to 98% of the dextrin and about 0.1% to 1% of the thickener.

Either one or both of the predust and batter may contain a flavoring, e.g. salt, cheese flavors, pepper flavors, salad dressing flavorings, such as the ranch flavoring, or any other flavors desired. However, since the predust is dry until coated with the batter, the dry predust may prevent possible degradation of the flavors which might otherwise occur when mixed with the water- containing batter. However, many flavors are dispersible in a water system without any substantial degradation of the flavor, even over long periods of time.

The amount of flavoring can vary widely, especially depending upon whether or not the flavor is dispersed in the predust or the batter, and may be in one or the other or both in amounts of 1% to about 20%. Flavors which are active at low concentrations, e.g. salt, will be toward the lower end of that range, and flavors which are more effective at higher concentrations, e.g. cheese flavors, will be toward the higher end of that range. However, more usually, the flavors will be in a range of about 3% to 15%, and more usually about 4% to 10%.

Any of the usual pectates may be used, but alkali pectates are preferred, and especially sodium pectate. The alkali pectates function favorably with the calcium compound, and sodium pectate functions particularly effectively with the calcium compound, especially when the calcium compound is calcium chloride. Thus, in a more preferred embodiment of the invention, the predust contains about 70% to 95% starch, about 1% to 10% flavorings, and about 0.5% to 1.5% calcium chloride and the pectate in the batter is sodium pectate.

As noted above, once the predust is applied to the food and the batter is applied to the predust, a reaction between the calcium compound and the pectate occurs to gel the two parts into an at least partially stabilized coating. At this point, the food could simply be frozen, since the coating is now firmly adhered to the food and freezing will at least partially stabilize the coating. However, the coating, at that point, will contain substantial amounts of water from the batter, and such freezing can introduce ice crystals, which are undesirable for some foods. It is, therefore, preferred that subsequent to the coating of the food, the coated food is heated sufficiently to reduce the moisture content of the coating to relatively low values, e.g. below 10%, and further, that subsequent heating is preferred, since the heating causes further reaction between the calcium compound and the pectate, causes film forming of the starch and dextrin, and, thus, establishes a more impervious barrier to prevent transmission of moisture into or out of the food during storage, e.g. while being frozen. That heating stabilizes the gelled coating in a much better manner than that of cooling the so-coated food, e.g. by freezing.

In this latter regard, in connection with the method of the invention, the method is that of producing an oil absorption and moisture transmission retarding, crunchy, coated food. The steps of the method comprise applying and adhering a predust onto the food, with the predust having at least about 50% starch and about 0.1% to 5% of an at least partially water-soluble calcium compound. A water-containing batter is applied and gelled and adhered to the predust. That batter, on a solids basis, will have at least 20% dextrin, about 0.1% to 8% of a pectate, and about 0.05% to 5% of a water-soluble thickener, along with other optional ingredients.

All of the starch, calcium compound, dextrin, pectate and thickener have been described above in connection with the product, and that description will not be repeated in connection with the process.

After the food has been coated with the predust and batter, the so-coated food is allowed to dwell for a sufficient time period such that the calcium reacts with the pectate to form sufficient calcium pectate so as to at least partially gel the coating. That dwell time can vary considerably with the particular pectate and the particular calcium compound, but, generally, that dwell time should be at least 2 to 3 seconds, and up to 30 to 40 seconds, but about 4 to 15 seconds being usual, and more usually about 7 to 12 seconds.

After the dwell time, the gelled coating is stabilized by heating or cooling the so-coated food product, as described above. Preferably, for the reasons mentioned above, however, the coating is stabilized by frying the coated food at a temperature of between 200° F. to 450° F. for a time sufficient to at least parfry the food, e.g. between 30 seconds and 4 minutes. This not only sterilizes the food, but so stabilizes the gelled coating that a very impervious barrier is formed. However, at that time, the food could be completely fried, with the purpose of simply reheating the food prior to serving, but it is preferred that the food be parfried so that the final heating for serving purposes will complete the frying, sterilize the outer portions of the food, and improve the aesthetic appearance and crispiness of the coated food.

While the frying may be in any desired manner, preferably the frying is oil frying, and more preferably deep-fat frying, since this assures quick heating of the food, stabilizing of the coating, and imparts a crispness to the coating on the food. Non-caloric fat substitutes, such as OLESTRA, may be used.

The batter may be applied to the predusted food in a variety of manners, such as passing the food through a conventional curtain coater for flowing the batter onto the predusted food, spraying the batter onto the food, and submerging the food in the batter. It is preferred that the predusted food be submerged into the batter, since this ensures a complete coating of the batter on the predusted food. Also, with use of conventional submerging apparatus, which usually constrains the food between a lower porous belt and an upper porous belt, the food can be completely coated when being submerged in the batter without any substantial displacement of the predust from the food. In addition, by controlled movement of those belts, the dwell time, discussed above, can be easily and accurately achieved. Particularly, when the coated food is submerged in that conventional manner, the dwell time is usually between 5 seconds and 20 seconds.

Also, particularly where the food is submerged into the batter, as described above, it is possible to adequately coat either thick or thin batters onto the food. Thus, while, as noted above, on a solids basis, preferably the batter contains about 15% to 35% solids, when using that submerging technique, the batter may have a ratio of solids to water of between 1:1 and 1:5. This wide range is, however, not normally used for most foods.

As noted above, the predust will contain about 50% starch, either in the form of starch or cereal flours or modified cereal flours. Of course, starch or cereal flours are in very fine particle size, e.g. somewhere in the range of about 50 to 100 microns. While such particle size provides a very uniform coating of the predust on the food, it was discovered that particle sizes of that range in the predust also have some decided disadvantages. In conventional dusting apparatus, the food is either rolled in the predust or the predust is fluidized, by agitation, and the food product is passed therethrough. Alternately, the predust is shaken from a conventional shaker onto the food as the food is passed under the shaker, while the food is, usually, rotated. These techniques can be used with the present process. However, in such operations, substantial amounts of the predust can be entrained in ambient air and may travel from production line to production line in natural air currents within a factory. This can contaminate other food production lines in the same factory and, in addition, can cause a substantial clean-up problem.

Further, that small particle size of the predust is more easily displaced from the predusted food when contacted with the batter, especially when the food product is submerged into the batter. This can cause some unevenness of the distribution of the calcium compound on the food and, consequently, an unevenness of the gelled or stabilized coating when reacted with that uneven distribution of the calcium compound.

Both of these problems can engender difficulties in commercial production of the coated food. It was discovered, however, that these problems could be overcome if the predust is at least in part in the form of cracker crumbs. To provide these cracker crumbs, the ingredients of the predust, i.e. the starch and the calcium compound, as well as optional ingredients, are made into a dough with an appropriate amount of water. The dough is the sheeted through a conventional sheeting apparatus to form very thin sheets of the dough, e.g. 1/32 to 1/4 inch, more usually about 1/16 of an inch in thickness. The dough is then baked in a conventional oven at conventional temperatures, e.g. 300° F. to 450° F. to form a relatively hard cracker of the dough. That hard cracker is then crumbled in a conventional crumbler to form crumbs of the cracker. The cracker is crumbled until the crumbs will pass through at least a #12, more usually a #40 and up to a #80 U.S. series screen. Those crumbs are then used as at least part of the predust in the product and process, as described above. This is the very most preferred form of the invention, and this form of the invention provides significantly better products.

When crumbs are used as the predust, the crumbs may contain a flavoring agent, but it is preferred that the flavoring agent not be mixed into the dough from which the crumbs are made, since much of the flavoring agent will be in the interstices of the crumbs and less detectable upon consuming. It is preferred that the flavoring agent be mixed with the already prepared crumbs.

Further, producing the cracker crumbs as the predust does not substantially increase the cost of the coating, since the cracker crumbs are made simply by sheeting a dough, baking the dough into a cracker, and crumbling the baked cracker into a particle size which will pass through the above-noted U.S. series screens. This is a rather inexpensive further improvement of the process, but one which provides very distinct and considerable advantages.

Here again, in connection with the crumbs, instead of starch, the starch may be in the form of cereal flours or modified cereal flours or a starch derived from such cereal flours, such as corn, rice or wheat or modified derivatives thereof. However, in the case of crumbs, it is preferable that the starch be in the form of cereal flours, since this produces a harder cracker and is easier to crumble. Thus, the crumbs are made from cereal flour, water and the calcium compound, as a most preferred embodiment.

The coating on the food, when at least parfried or finish fried, can range from a very clear coating to a somewhat translucent or nearly opaque coating, depending upon the ingredients of the coating and the amount of those ingredients. For some foods, a clear coating is especially advantageous, while with other foods, a somewhat translucent or nearly opaque coating may be desired. In all cases, however, the coating is very crispy, forms a very substantial barrier (after stabilization by heating, e.g. frying) to transfer of oil into the food during or after frying or the transfer of moisture into or out of the food during frying or storage.

For example, if the clearest coating is desired, then the starch is preferably modified corn starch, since this gives a very clear coating and very little taste to the coating, unless the coating is purposefully flavored. Other modified starches may be used, e.g. wheat starch, corn starch and the like, with some slight changes in the clarity of the fried coating. On the other hand, where such a clear coating is not required, and in some foods such a clear coating is not desired, other starches or cereal flours may be added to the predust and/or batter to produce a less clear but yet somewhat translucent coating or even a nearly opaque coating.

Similar variations are achieved in the coating by the particular choice of the dextrin. The dextrins are, of course, polysaccharides obtained from starches by action of heat, acids or enzymes, but, depending upon the particular process for producing the dextrins and the particular starch from which the dextrins are produced, some changes in the coating, such as clarity and crunchiness, will result. While any of the starch dextrins may be used, it has been found that tapioca dextrin is particularly advantageous. This provides the clearest of coatings and provides an exceptionally strong barrier to transmission of oils and moisture and has a clean flavor profile.

Somewhat similarly, the pectate will have some effect on the properties of the coating. Of course, pectin is a variety of water-soluble substances in plant tissues that yield a gel, and pectic acid is a variety of water-soluble substances formed by hydrolyzing the methyl ester groups of pectins. The present pectates are the alkali derivatives thereof, and, thus, both the original source of the pectin and the particular process of ultimately producing the pectate can effect the properties of the pectates when used in the present coating. Thus, the alkali pectates are all useful, but the preferred sodium pectate is easily placed in the batter and rapidly reacts with the calcium compound, especially calcium chloride, to gel the two-part coating system and minimize the dwell time required, as discussed above. The sodium pectate also provides a very substantial barrier to transmission of oil and moisture and produces a relatively clear and crunchy coating.

By choosing among the particular starches, dextrins and pectates, a coating can be produced that is so clear that the finished food (after frying) gives the appearance of a food which has not been coated at all, although the food will be crunchy and flavorful. This very clear and crunchy coating with the substantial barrier is particularly important to certain types of foods, for example, French fried potatoes. As the prior art discloses, considerable efforts have been made toward coatings for French fried potatoes, French fried onion rings and the like, where it is most desired that essentially no appearance of a coating be on the food, but where the coating will provide the food with a longer shelf life after frying. That shelf life, for example, is dependent upon the transfer to and redistribution of moisture in the potato both during frying and while the potato is at a holding station prior to serving, for example, as very often occurs in fast-food establishments. During the frying of an uncoated potato, considerable amounts of oil will infuse to the potato, and substantial amounts of moisture will be removed from the potato. After frying and while at a holding station, additional surface oil can infuse into the potato and moisture transmission is also quite high. As a result, shortly after freshly frying the potato, the potato can have, instead of a fresh and crisp taste, a limp and soggy taste. Indeed, in many establishments, general guidelines are set such that French fried potatoes cannot be served to a customer after the potatoes have been at a holding station for 5 minutes (a holding station normally implies the use of heat lamps to keep the potatoes warm).

The present very clear coating is essentially not detectable on French fried potatoes, while, at the same time, the coating prevents substantial infusion of oil during the frying process and surface oil and moisture transmission after the frying process. As a result, French fried potatoes with the present coating thereon can be held at a serving station for a much longer length of time, e.g. up to 10 minutes or even 20 minutes, in regard to some of the more preferred forms of the coating, as discussed above. Thus, the present invention is particularly applicable to French fried potatoes and has very distinct advantages in connection therewith.

The foregoing is also true in connection with specifically flavored French fried potatoes, e.g. nacho-flavored French fried potatoes. With the present coating, that flavoring is largely preserved during the process, as opposed to conventional coatings. However, if the nacho flavoring and like flavorings are placed in the batter, as noted above, some of that flavoring may be lost, especially during the frying process, but if such flavorings are placed in the predust, the batter tends to protect the flavoring during frying and there is little loss of such flavors, especially through volatility thereof. Thus, with the present coating, such specialty flavors can be efficiently used to flavor the foods, e.g. French fried potatoes, and with relatively small amounts of flavoring, as compared to the amounts required by conventional coatings.

For such special flavorings, such as nacho cheese flavoring, a most preferred embodiment is where the predust contains 88% modified starch, 11% flavoring and 1% calcium chloride. The batter used with such flavorings is usually a thin batter, and the preferred batter contains about 98% tapioca dextrin, about 1.5% sodium pectate, about 0.5% xanthan gum, and sufficient water to make a thin batter. Preferably, the ratio of solids to water will be about 1:4 to 1:3.

Coatings of the above-described nature, however, are not restricted to coatings with high amounts of flavoring. Such preferred coatings can also be used where essentially no flavoring is placed in the coating, for example, when coating fish filets. In such foods, it is far preferable that the foods have the appearance of essentially no coating thereon. Thus, the fish filet can be predusted and battered, as described above, and then fried at a temperature of 350° F. to 390° F. to provide a finished product which can be held at a holding station for quite some time without moisture transmission or oil transmission through the barrier of the coating. On the other hand, the so-coated filet can be parfried at a slightly higher temperature, e.g. 380° F. to 400° F., and then frozen. The filet can then be finish fried at a restaurant by frying at a lower temperature, e.g. about 350° F., until the filet is fully cooked and hot. Since the coating will almost not be detectable on the finish fried fish (except for the crunchy mouth feel), in view of the clearness of the coating, the coating is particularly applicable to that food in view of the lack of oil and moisture transmission through the coating prior to eating and in view of the crispiness of that coating.

Parfrying will vary with the particular food, of course, but, generally speaking, the parfrying (prefrying) will be in the range of about 10 to 120 seconds, and more usually about 20 to 50 seconds, e.g. 30 seconds, at temperatures about 380° F. to 400° F. The finish frying will be at slightly lower temperatures, since the barrier will have already been essentially fully set during the parfrying, e.g. can be finish fried at about 350° F. The finish frying time will vary with the particular food product, the thickness thereof, and the like, but usually about one minute to four minutes or so is satisfactory for the finish frying.

In addition to flavorings, the predust and the batter may have other optional ingredients. A small amount of such oil can be added to the batter and the predust. The small amount of added oil also decreases the ambient dust in a commercial factory, as discussed above. Added oil will generally be less than 4%. Likewise, both the predust and the batter may have conventional amounts of conventional stabilizers, leavening, antioxidants, antimicrobial agents, colors, and the like.

If it is desired to decrease the clearness of the coating, additional cereal flours or starches may be added to either or both of the predust and batter. The conventional so-called adhesion starches, e.g. corn starch, tapioca starch and wheat starches, are particularly well suited for this purpose. Mixtures of cereal flours and starches may also be used for this purpose, e.g. mixtures of corn starch (and adhesive starch) and wheat flour. The amount of such optional cereal fours and/or starches can vary widely, depending on the amount of opacity desired, but, for example, the predust and/or the batter may have from 0–70% thereof. For example, adding about 40% of the cereal flour and/or starch to both the predust and batter will substantially decrease clearness but provide a very strong barrier.

In some coatings, it is desired to have some browning appearance. This can be achieved by adding dextrose to the predust and/or batter, but preferably to the batter. The browning will increase with the amount of dextrose added, but usually from 1% to 20%, e.g. 3% to 10%, and especially about 8% is sufficient.

In some foods, it is desired that the coating be more tender. To provide a more tender coating, relatively small amounts of soft flours, e.g. rice flour, may be added to the predust and/or batter, but preferably to the batter. Amounts between 5% and 20% are normally used, e.g. between 8% and 15%, especially about 10%.

An important feature of the present invention is that the two-part coating system is easily applied by a food processor. The processor need only be supplied with two "bags", one containing the predust and one containing the solids of the batter. To coat food products, the processor need only put the predust in a dusting apparatus and mix the dry batter ingredients with the correct amount of water for placing in a conventional battering machine. This makes the coating very easy to use.

The invention will now be illustrated by the following examples, but it is to be understood that the invention is not limited to the examples but extends to the foregoing disclosure and the breadth of the annexed claims. In the examples, as in the specification and claims, all percentages and parts are by weight unless otherwise designated.

EXAMPLE I

A predust was prepared by blending 88% modified corn starch, 11% commercial nacho cheese flavoring, and 1% calcium chloride. That predust was placed in a conventional shaking preduster.

A thin batter was prepared by mixing 98.47% tapioca dextrin, 1.23% sodium pectate, and 0.3% xanthan gum with sufficient water to make a thin batter in the viscosity of whole milk. The batter was placed in a conventional submersion-type coater.

Potatoes were cleaned, peeled and cut into French fried potato-size strips. The strips conventionally were blanched, treated with a conventional phosphate solution and placed in the preduster, which shakes the product while the product rolls through the preduster to uniformly coat the strips of potato with the predust.

The predusted potato strips were placed between constraining moving porous belts, and then submerged into the batter. The upper belt constrained the potato strips from moving or floating, and the lower belt constrained the potato strips from being displaced from between the belts. After complete submergence of the potato strips for about 5 seconds, the belts, with the potato strips therebetween, emerged from the batter, and while being constrained between the two belts, the strips were allowed a dwell time of 10 seconds, where the two-part coating was gelled and adhered to the potato strips.

Immediately thereafter, the so-coated potato strips were immersed into deep fat (soybean oil), maintained at 350° F., and were parfried in that fat for 30 seconds. After emerging from the fat fryer, the parfried potato strips were released from between the belts and allowed to cool.

Immediately thereafter, the so-coated and parfried potato strips were flash frozen. After a three-week frozen period, the coated and parfried potato strips were thawed to about room temperature and finish fried at 350° F. in soybean oil for about 2.5 minutes. Thereafter, the finish fried French fried potatoes (potato strips) were allowed to drain and placed in a holding station (heated by heat lamps). The so-coated and French fried potatoes had a very clear coating which was essentially non-detectable by the consuming public, except for the crisp and crunchy mouth feel. The potato strips were appropriately salted and then tasted by a test panel immediately after salting, at 10 minutes at the holding station and at 20 minutes at the holding station.

The panel results were that immediately after the salting, the French fried potatoes had an appearance of a French fried potato without any coating, but were exceptionally crispy, much more so than a natural uncoated French fried potato. The moisture content was essentially the same as would be expected from a naturally French fried potato, and there was no surface oiliness.

After 10 minutes, the French fried potatoes were still crispy and had the expected moisture content. The coating remained clear and not essentially detectable.

After 20 minutes, the French fried potatoes remained of expected moisture content and had no noticeable surface oil, but the crispness had very slightly deteriorated. The coating was still clear and essentially undetectable.

EXAMPLE II

A cracker was prepared by sheeting a dough made of wheat flour, about 0.5% calcium chloride and sufficient water to make the dough; the dough was baked at 350° F. until slightly brown, and then crumbled in a conventional crumbler until the crumbs passed through a #20 U.S. series screen.

A predust was blended in a ribbon blender. The predust had the following ingredients:

| Cracker crumbs | 49.87% |
| --- | --- |
| Corn starch (an adhesive starch to reduce clearness) | 41.92% |
| Flavorings | 7.51% |
| Calcium chloride | 0.50% |
| Soybean oil | 0.20% |
| | 100.00% |

A batter was prepared by mixing the following dry ingredients in water at 70° F. with a Lighting Mixer. The ratio of dry ingredients to water was 1:4 and the mixing continued for about 14 minutes:

| Tapioca dextrin | 40.05% |
| --- | --- |
| Corn starch (an adhesive starch to reduce clearness) | 40.20% |
| Rice flour (to increase tenderness of the coating) | 10.00% |
| Dextrose (to add color to the coating) | 8.00% |
| Sodium pectate | 1.50% |
| Xanthan gum | 0.15% |
| Soybean oil | 0.10% |
| | 100.00% |

Chicken parts were coated with the predust in a conventional shaker apparatus filled with the predust and then submerged in the batter contained in a conventional submersion coater for about 4 seconds. After emerging from the submersion coater, the parts were allowed to dwell for about 10 seconds and then parfried in soybean oil at 385° F. for 30 seconds. After cooling, the parts were flash frozen.

Three months after freezing, the parts were thawed to about room temperature and finished fried in soybean oil at 350° F. for four minutes. The fried parts had a crisp but tender coating. The coating had light brown highlights and was nearly opaque. The chicken was moist inside, and there was no objectionable surface oiliness.

Accordingly, it can be seen that the present coating provides a very advantageous coating to foods, and especially the coating is applicable to extending the serving station shelf life of food products, such as French fried potatoes. The invention, however, extends to the spirit and scope of the annexed claims.

What is claimed is:

1. A food having an oil absorption and moisture transmission retarding, crunchy coating thereon, which coating comprises:

(A) a predust adhered to the food and having at least about 50% of a starch and from about 0.1% to 5% of an at least partially water-soluble, edible calcium compound; and (B) a water-containing batter gelled and adhered to the predust and having, on a solids basis, at least about 20% dextrin, about 0.1% to 8% of a pectate, and about 0.05% to 5% of a water-soluble thickener.

2. The food of claim 1, wherein the predust contains 80% to 95% of the starch.

3. The food of claim 2, wherein the starch is in the form of or derived from cereal flours and modified cereal flours.

4. The food of claim 3, wherein the starch is in the form of cereal flours and modified cereal flours or starch derived from corn, rice and wheat or modified derivatives thereof.

5. The food of claim 1, wherein one or both of the predust and batter contain a flavoring.

6. The food of claim 5, wherein the flavoring is contained in the predust.

7. The food of claim 1, wherein the calcium compound is selected from the group consisting of calcium hydroxide, calcium phosphate, calcium lactate and calcium chloride.

8. The food of claim 1, wherein the calcium compound provides at least 50 PPM of solubilized calcium in the adhered batter per 1% of pectate in the batter.

9. The food of claim 1, wherein the batter contains about 15% to 35% solids and, on a solids basis, contains about 1 to 2% of the pectate, about 97% to 98% of the dextrin and about 0.1% to 1% of the thickener.

10. The food of claim 1, wherein the thickener is a gum.

11. The food of claim 1, wherein the predust contains about 70% to 95% starch, about 1% to 10% flavorings, about 0.5% to 1.5% calcium chloride and the pectate is sodium pectate.

12. The food of claim 1, wherein the coated food is in a parfried condition or a fully fried condition.

13. The food of claim 1, wherein the predust is at least in part in the form of cracker crumbs.

14. The food of claim 13, wherein the crumbs contain flour, water and the calcium compound.

15. The food product of claim 13, wherein the crumbs have a flavoring.

16. The food product of claim 13, wherein the crumbs will pass through a #12 U.S. series screen.

17. The food product of claim 1, wherein the food is selected from vegetables, meats, seafood and poultry.

18. The food product of claim 17, wherein the food is potato strips.

19. A method for producing an oil absorption and moisture transmission retarding, crunchy, coated food comprising:

(A) applying and adhering a predust onto the food, said predust having at least about 50% starch and about 0.1% to 5% of an at least partially water-soluble calcium compound;

(B) applying and adhering a water-containing batter to the predust to provide a coated food, said batter having, one a solids basis, at least about 20% dextrin, about 0.1% to 8% of a pectate and about 0.05% to 5% of a water-soluble thickener;

(C) allowing so-coated food to dwell for a sufficient time period such that the calcium of the calcium compound reacts with the pectate to form sufficient calcium pectate so as to gel the coating; and (D) stabilizing the gelled coating by heating or cooling the so-coated food.

20. The process of claim 19, wherein the coating is stabilized by frying the coated food at a temperature between 200° F. and 450° F. sufficiently to stabilize the coating to an oil and moisture transmission barrier coating.

21. The process of claim 20, wherein the frying is by frying in deep-fat.

22. The process of claim 20, wherein the coated food is parfried.

23. The process of claim 19, wherein the batter is applied by submerging the food into the batter.

24. The process of claim 19, wherein the predust is at least in part in the form of cracker crumbs.

25. The process of claim 24, wherein the cracker crumbs are made by sheeting a dough containing flour, water and the calcium compound, baking the dough into a cracker and crumbling the baked cracker to particle sizes which will pass through a #12 U.S. series screen.

26. The process of claim 19, wherein the dwell time is 5 to 20 seconds.

27. The process of claim 19, wherein the predust contains 80% to 95% of the starch.

28. The process of claim 25,wherein the starch is in the form of, or derived from, cereal flours and modified cereal flours.

29. The process of claim 28, wherein the starch is in the form of cereal flours and modified cereal flours or starch derived from corn, rice and wheat or modified derivatives thereof.

30. The process of claim 19, wherein one or both of the predust and batter contain a flavoring.

31. The process of claim 30; wherein the flavoring is mixed with the predust.

32. The process of claim 19, wherein the calcium compound As selected from the group consisting of calcium hydroxide, calcium phosphate, calcium lactate and calcium chloride.

33. The process of claim 19, wherein the calcium compound provides at least 50 PPM of solubilized calcium in the batter per 1% of pectate in the batter.

34. The process of claim 19, wherein the batter contains about 15% to 35% solids and, on a solids basis, contains about 1% to 2% of the pectate, about 97% to 98% of the dextrin and about 0.1% to 1% of the thickener.

35. The process of claim 19, wherein the thickener is a gum.

36. The process of claim 19, wherein the predust contains about 70% to 90% starch, about 1% to 20% flavorings, about 0.5% to 1.5% calcium chloride and the pectate is sodium pectate.

37. The process of claim 19, wherein the predust is in the form of a mixture of cracker crumbs and cereal flour.

38. The process of claim 37, wherein the crumbs contain cereal flour, water and the calcium compound.

39. The process of claim 38, wherein the crumbs have a flavoring.

40. The process of claim 37, wherein the crumbs will pass through a #12 U.S. series screen.

41. The process of claim 19, wherein the food is selected from vegetables, meats, seafood and poultry.

42. The process of claim 41, wherein the food is potato strips.

* * * * *